July 21, 1942. A. F. HICKMAN 2,290,182
SHACKLE FOR SPRING SUSPENSIONS
Filed April 20, 1940 3 Sheets-Sheet 1

INVENTOR
Albert F. Hickman
BY
Popp and Popp
ATTORNEYS

July 21, 1942. A. F. HICKMAN 2,290,182
SHACKLE FOR SPRING SUSPENSIONS
Filed April 20, 1940 3 Sheets-Sheet 2

INVENTOR
Albert F. Hickman
BY
Poggs and Poggs
ATTORNEYS

July 21, 1942.  A. F. HICKMAN  2,290,182
SHACKLE FOR SPRING SUSPENSIONS
Filed April 20, 1940  3 Sheets-Sheet 3
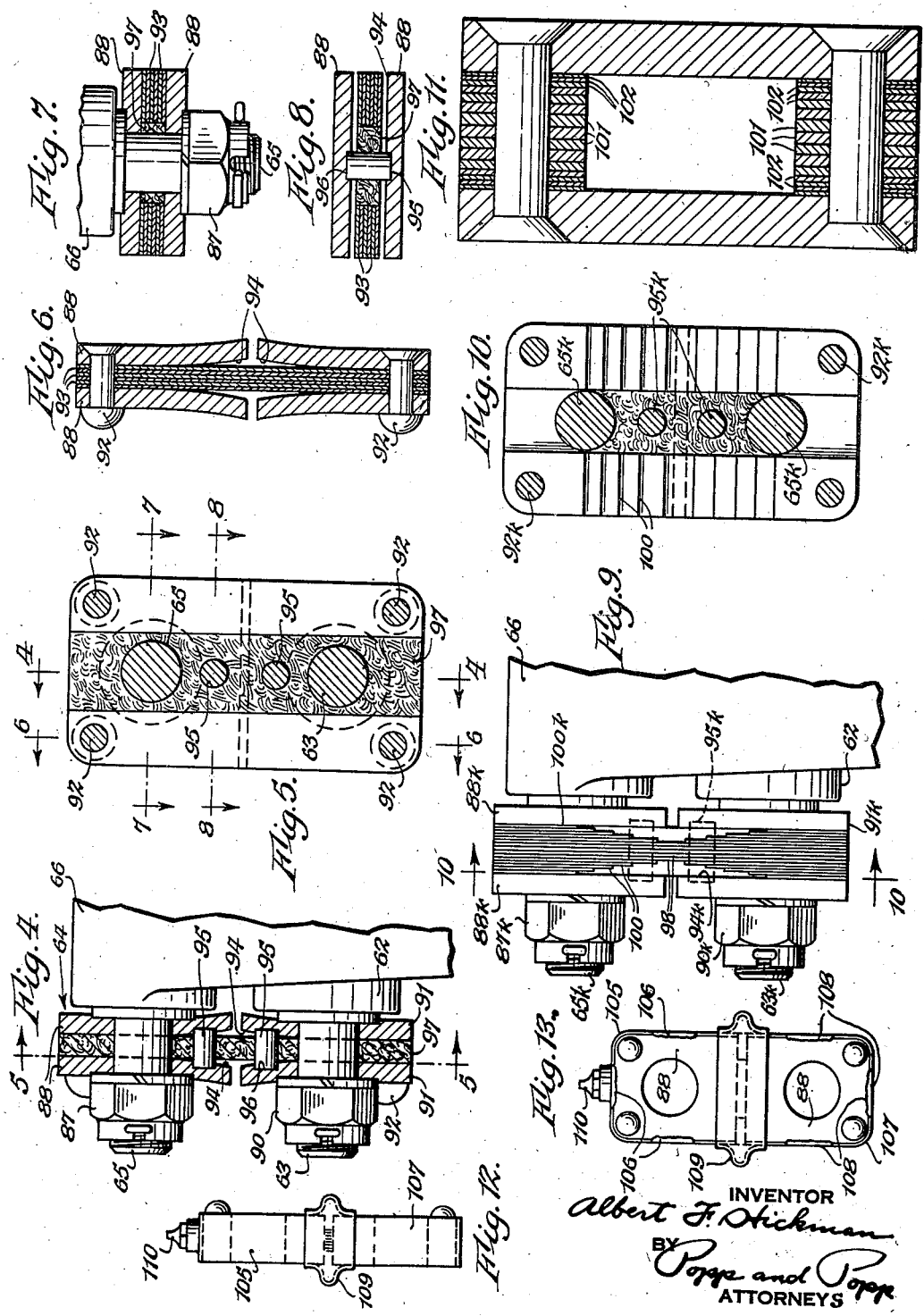

Patented July 21, 1942

2,290,182

UNITED STATES PATENT OFFICE 2,290,182

SHACKLE FOR SPRING SUSPENSIONS

Albert F. Hickman, Eden, N. Y., assignor to Hickman Pneumatic Seat Co. Inc., Eden, N. Y., a corporation of New York Application April 20, 1940, Serial No. 330,735

17 Claims. (Cl. 267—54)

This invention relates to shackles for vehicle spring suspensions and more particularly to flexible kick shackles for a type of spring suspension for axles in which each axle is permitted to move against the geometric resilient resistance, both laterally and longitudinally relative to the vehicle frame, both when the vehicle has a low percentage of load variation and also when it has a high percentage of load variation.

This application is a continuation in part of my copending application for Vehicle spring suspension, filed March 16, 1937, Serial No. 131,193, now Patent No. 2,198,616, dated April 30, 1940.

The flexible kick shackles forming the subject of this application are particularly intended for use in a spring suspension of the type shown in my said copending application and having the advantages and objects therein stated although it will be understood that the invention is not limited to the use of the flexible kick shackles in such type of suspension.

One of the objects of the invention is to provide a frictionless, metallic kick shackle which will provide a geometric increase of resistance to axle movement.

Another object of the invention is to provide a means of protecting a resilient shackle in a spring suspension from dust, and, at the same time, of lengthening the lubrication intervals of said shackle.

Another object of the invention is to provide a resilient shackle for a spring suspension in which very accurate assembly fitting may be obtained without necessitating expensive machine work on the parts and without involving any manufacturing operations (such as bending) which by their very nature cannot result in a product of uniform dimension.

Another object of the invention is to provide a resilient shackle for a spring suspension in which the resistance of said shackle to flexure is of accurate geometric nature and yet can be manufactured with the most generous and easily attained manufacturing tolerances.

In the accompanying drawings:

Fig. 4 is a enlarged vertical, longitudinal section through one of the resilient shackles embodying my invention, taken on line 4—4, Fig. 5.

Figs. 5 and 6 are vertical, longitudinal sections through said resilient shackle, taken on lines 5—5 and 6—6 of Figs. 4 and 5, respectively.

Figs. 7 and 8 are horizontal, transverse sections through said shackle, taken on the correspondingly numbered lines of Fig. 5.

Fig. 9 is an enlarged, side elevation of a modified form of resilient shackle.

Fig. 10 is a vertical, longitudinal section thereof, taken on line 10—10, Fig. 9.

Fig. 11 is a considerably enlarged, horizontal, transverse section through still another modified form of resilient shackle.

Fig. 12 is a diminutive side elevation of the form of shackle shown in Figs. 4–8 and showing the shackle encased.

Fig. 13 is a side elevation of the encased shackle shown in Fig. 12.

While flexible kick shackles embodying the present invention can be used in many types of spring suspensions, they are illustrated as embodied in a tandem axle suspension for a vehicle chassis having the usual rectangular frame 50 consisting of a pair of longitudinal frame bars 51, 510 suitably joined together transversely by a plurality of cross frame bars 52 in the usual and well known manner. Frequently, in modern practice, the imposed loads are transmitted directly from the vehicle spring suspension to the body in which case the "frame" is little more than a template, but this question is of no importance here and need only be mentioned in passing to prevent any impression that the present invention requires such a relatively heavy frame as that shown.

Figure 3:
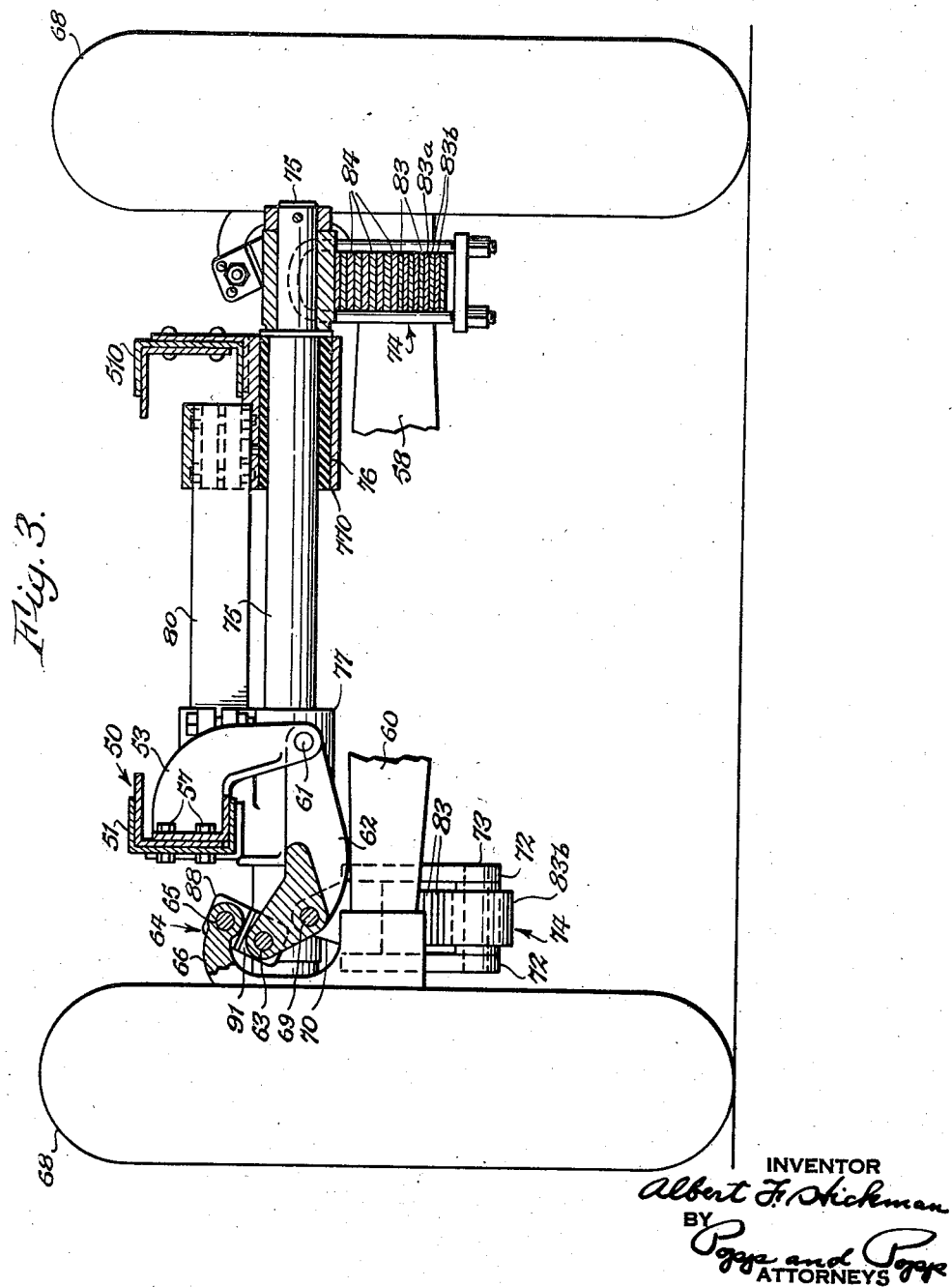
Fig. 3 is a rear elevation, with parts in section, of the spring suspension shown in Figs. 1 and 2.

Secured by rivets 49 or otherwise to the inner face of each frame bar is a pair of downwardly projecting front, bifurcated brackets 53, 53a (see Fig. 3). Arranged on said frame bar rearwardly of said front brackets are a pair of similar, downwardly projecting, rear bifurcated brackets 54, 54a. These rear brackets are longitudinally adjustable, relatively to their companion frame bar 51 or 510, by means of adjusting screws 55, 55a which are threaded in suitable angle plates 56, 56a secured to inner vertical faces of the web of their companion frame bar. When the proper adjustment of these rear brackets 54, 54a has been suitably effected, the same are locked in position by fore and aft pairs of clamping bolts 57, 57a, it being understood that the holes in either the frame bars 51, 510 or the holes in the rear brackets themselves are either of elongated shape or are drilled sufficiently large to permit a small amount of longitudinal movement of said rear brackets relatively to their companion frame bar.

The front brackets 53, 53a are connected to the front axle 58 in a manner identical with the connection between the rear brackets 54, 54a and the rear axle 60 and hence only the former connection will be described.

Figures 1, 2:
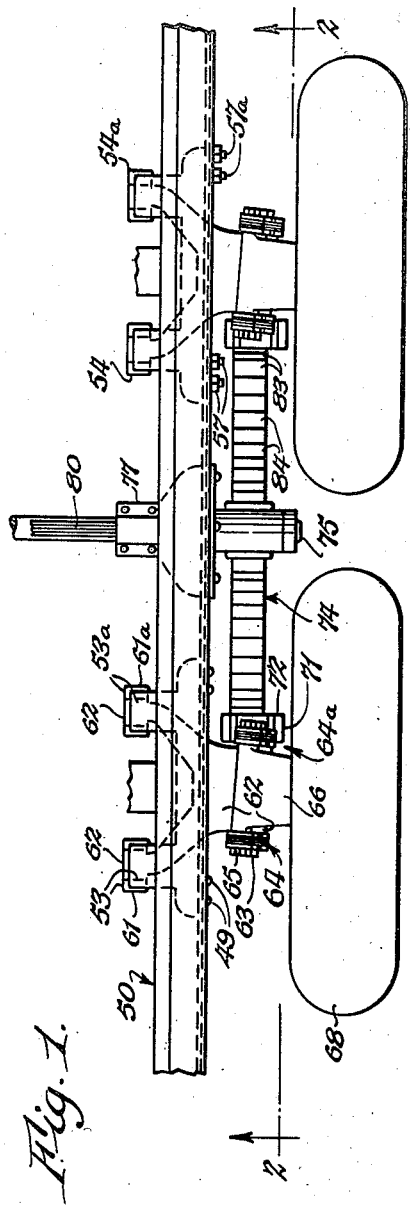
Fig. 1 is a fragmentary top plan view of a tandem axle spring suspension having flexible kick shackles embodying my invention.
Fig. 2 is a vertical, longitudinal section thereof, taken on line 2—2, Fig. 1.

Pivoted at its inner bifurcated ends at 61, 61a to the front brackets 53, 53a is a Y-shaped lever 62. The axis of said pivots 61, 61a slopes downwardly and rearwardly, i. e., it is inclined to the horizontal but lies in a plane parallel to a vertical plane passing longitudinally through the vehicle. Each of said Y levers 62 is pivoted at its outer end on lower pivots 63 to the lower ends of a pair of resilient shackles 64, 64a which will be subsequently described in detail. These shackles slope upwardly and rearwardly from said lower pivots 63, as shown in Fig. 2, and also slope upwardly and inwardly from said pivots 63, as shown in Fig. 5, and are pivotally connected at their upper ends at 65 to an axle post 66 connected with a companion front axle 58. This upward and inward inclined arrangement of said shackles tends to cause each axle to centralize itself in a direction transverse of the frame and enables the action of gravity to geometrically and resiliently resist any such movement of said axle away from its central position. This permits the vehicle body to move substantially straight ahead despite a certain amount of lateral movement of the axle. This is what I term the "lateral cushioning" of the vehicle frame relatively to one or more of the axles and is discussed at greater length in my earlier patents and patent applications.

The oblique position of the axis of the pivots 61, 61a permits either wheel 68 to freely move a short distance rearwardly whenever said wheel rises and, concomitantly, permits said wheel to move a short distance forwardly whenever said wheel falls. This enables the peripheral speed of the wheel to be maintained substantially constant when travelling over irregularities, and, at the same time, enables the axis of the wheel to receive the sudden horizontal thrusts which inevitably result as a consequence of said uniform peripheral speed, without imparting these thrusts directly to the frame. Some of these forward and backward thrusts are imposed upon the axle before its inertia enables it to rise rearwardly or fall forwardly and these longitudinal thrusts are absorbed in the present invention by the shackles 64, 64a which are so constructed in accordance with the present invention so as to be resilient and thereby permit a limited amount of horizontal, longitudinal axle movement even in the absence of vertical movement of the axle such as occurs in practice when the irregularity is entirely absorbed by the tire.

The axes at the upper and lower ends of the shackles are also preferably disposed at an acute angle with respect to a vertical plane positioned transversely of the vehicle. This angularity, in combination with the upward, inward slope of the shackles, renders each of the rear axles independently self-steering, as will be explained hereinafter.

Pivoted horizontally and longitudinally of the vehicle at 69 at the outer lower part of each lever 62 is a rocking head 70 provided with a downwardly projecting arm. The latter is pivoted horizontally and transversely at 71 to the upper end of a link 72 whose lower end, in turn, is horizontally and transversely pivoted at 73 to the companion end of a companion, semi-elliptic, laminated or leaf spring 74.

The central, thick part of said semi-elliptic spring 74 is pivoted on a cross shaft 75 which is journaled horizontally and transversely of the vehicle in rubber cushions 76 arranged in companion cushion brackets 77, 77a. It is to be understood that the cross shaft 75 does not rotate to any appreciable extent in these cushion brackets 77, 77a, but only that the rubber cushions which are arranged between said brackets 77, 77a and said cross shaft 75 permit the latter to flex freely without any metallic, positive hindrance and thereby permit such frame weaving as is bound to occur in actual practice, particularly in heavy trucks. These rubber cushions 76 also deaden such noises as would occur if the two metallic members involved were in direct contact with each other and were, in addition, able to move relatively to each other. It is true that the present invention employs the form of laminated cross bar 80 which has been explained in detail in my Patent No. 2,087,255, dated July 20, 1937, for Vehicle spring suspension, but it is to be remembered that this cross bar 80 only controls the distance between the cushion brackets 77, 77a and not their angular position relatively to each other.

As shown in Fig. 2, the lower eight leaves 83 of the semi-elliptic spring 74 are all very thin and are of equal thickness. The upper leaves 84 of said spring are, on the other hand, relatively thick and are also of equal thickness, but this thickness is larger than the thickness of the lower leaves 83. Furthermore, the upper, thick spring leaves 84 are relatively straight whereas the lower thin leaves are all provided with a certain amount of camber. The action of such a "compound," semi-elliptic spring is to provide a geometric rate of resistance in which the resistances to initial movement are progressively greater but very small in amount whereas resistances to increasing movement are progressively greater and relatively large in amount. In addition to this the construction of this leaf spring 74 is such that the normal life of all of its leaves is the same. This result is obtained by so proportioning the size and the shape of the lower leaves 83 as to have a proper fatigue strength based upon the very high total number of stress fluctuations to which they are subjected during their total life. The upper, thick leaves 84 are also so proportioned as to have a proper fatigue strength based on their total number of stress fluctuations but this latter number is relatively so low that these upper spring leaves may be considered as subjected to merely static loads and hence the allowable stress may be much higher than with the thin leaves 83.

As far as pure stress in the different leaves is concerned, such a differential in stress could be obtained by relatively minor changes in a conventional laminated spring. But another factor is involved, namely that the spring provides a geometric rate of resilient resistance with a very "flat" curve at normal loadings and a very rapid change to a "steep" curve at higher loadings. Applicant's spring attains both of these results simultaneously by having each infinitesimal portion of steel in each spring leaf stressed in accordance with its particular fatigue strength as encountered in actual service and, at the same time, by having the spring so arranged, as a unitary whole, as to be very soft for increments of load slightly greater than its normal load and rapidly, increasingly stiff for increments of load considerably different from its normal load.

The resilient shackles 64, 64a, as shown in Figs. 4-8, which form the subject of the present application, are preferably constructed as follows:

Securely clamped to the axle pivot 65 by a clamping nut 87 is a pair of heavy-gauge, sheet metal, upper shackle heads 88. Similarly clamped to the crank arm pivot 63 by a clamping nut 90 is a similar pair of lower shackle heads 91. Clamped between said upper and lower pairs of shackle heads 88, 91 and secured thereto by rivets 92, are two sets of laminated, metal, resilient strips 93 which carry the tensile stress between the pivots 65 and 63 and allow the latter to move longitudinally relatively to each other and to swing a small amount out of parallelism relatively to each other whenever their companion axle rises or falls, this movement being due to the fact that the pivots 65, 63 are not parallel to the frame pivot or fulcrum 61, 61a of the Y-shaped lever 62.

These laminated strips 93, being resilient, permit the pivots 65 and 63 to move a short distance longitudinally relatively to each other and also to twist slightly relatively to each other as just explained. Resistance to both of these movements should be, and in the present invention is, of a geometric nature, as explained in detail in my United States patent for Vehicle suspension, No. 2,160,862, dated June 6, 1939. This geometric effect is obtained by limiting the flexing of the laminated strips 93 by curvilinear faces 94 formed on the upper and lower shackle heads, 88 and 91. To obtain such curvilinear faces 94 by a machining operation is expensive, and die casting is, of course, out of the question. On the other hand, while these heads are made of heavy sheet metal and can be bent to shape, it is well known that the product of such bending is sure to be variable in actual production practice. In the present invention all of these difficulties have been surmounted by first bending said heads 88, 91 a relatively small amount and then assembling and clamping them together (with the laminated strips 92, etc., in place), with a small spacing pin 95 interposed between each pair of heads, said pin being received at its opposite ends in shallow, cylindrical depressions 96 suitably formed in the opposing faces of each pair of heads. Both the length of these pins 95 and the depth of the depressions 96 can be easily machined within close tolerance limits and hence the final position of the curvilinear faces, relatively to each other, can be held within fine tolerance limits despite the fact that they are bent into their final shape and are not machined.

Interposed between the two sets of laminated, resilient strips 93 is a felt block or lubricating wick 97 which is saturated with oil when the shackle is assembled. This felt wick is held in place by being suitably cut or punched out at its upper and lower ends to encircle the axle pivot 65, the crank arm pivot 63, and the spacing pins 95. Said wick 97 is saturated with lubricating oil or light grease when the shackle is assembled at the factory and this has been found, in actual practice, to effectively lubricate the laminated strips 93 for a very long period of service and prevents said strips from rusting while in service and also prevents dust from working into the interior of the shackle.

Figs. 9 and 10 illustrate a modified form of shackle in which the shackle heads 88k and 91k have straight inner faces, the geometric feature of the resilient resistance of the shackle being obtained by the arrangement of the laminated strips themselves. In this case the laminated strips are of variable length, the central five strips 98 extending the full length of the shackle, while the outer strips 100 are progressively shorter in length. All of the strips are suitably secured at their outer ends to the shackle heads 88k, 91k by rivets 92k. Thus, despite the fact that all of the strips are of equal thickness, whenever the shackle is increasingly flexed, the inner flat faces 94k of the heads 88k and 91k make abutting contact with the tips of the successively longer strips 100 and thereby cause the shackle as a whole to resist flexure at an accelerated or geometric rate. As far as manufacturing tolerances are concerned this type of shackle does not need any spacing pins 95k at all, but to obtain compactness it is desirable to have the strips as short as possible and this results in the outermost strip 100k of the graduated strips 100 being so short as to not secure a solid base or support for the nuts 87k and 90k and thereby tending to thrust the outboard ends of each pair of shackle heads 88k and 91k toward each other. Any such tendency is prevented positively and accurately by the aforesaid spacing pins 95k. If desired a felt block or lubricating wick 97k may be interposed between the sets of resilient strips in a manner similar to the lubricating felt 97 of Figs. 4-8. In the present case, however, the felt 97k does not encircle the pivots 65k and 63k inasmuch as the latter are in contact with all of the resilient strips and hence are able to prevent any possibility of the graduated strips 100 moving inwardly toward each other and interfering with the lubricating felt 97.

Fig. 11 shows a modified form of resilient shackle which is similar to the form of Figs. 9, 10 except that, instead of all of the resilient strips being of equal thickness, the central resilient strips 101 are relatively thick while the outer resilient strips 102 are progressively thinner. This arrangement equalizes the effective stress in the various strips either if we assume that the progressive increase in length of the strips is substantially arithmetic as indicated in the construction of Figs. 9 and 10, or if we assume that the progressive increase in length is of geometric character. This equalization of the effective stress results from the fact that the number of vibrations to which the outer strips are subjected during the total life span of the shackle is considerably greater than the number of vibrations to which the inner strips are subjected. This is because every movement of the shackle causes a relatively sharp flexing of the outer strips whereas only the larger movements of the shackle cause any sharp bending of the inner strips. It is well known that a thin strip can be bent around a given radius with less maximum stress imposed upon the outer fibers than in the case of a thicker strip. Hence, even if the actual radius of curvature is the same for both the outer and inner strips, the static stress on the thinner outer strips is less and, because of their larger total number of variations per life is greater, the effective stress is caused to be the same in all the strips of the shackle. In other words, this shackle is like the one horse shay in that, when any one strip reaches the end of its life and breaks, all of the other strips have also reached the end of their lives too.

This is, of course, a theoretical ideal and cannot be strictly obtained in actual commercial practice, but it is the ideal to be sought and forms the proper basis for the design of the various parts of the shackle.

Any of the forms of shackles illustrated in Figs. 4–11 can be readily encased to prevent the entrance of dust and dirt in the manner illustrated in Figs. 12 and 13, the casing there shown being more particularly applied to the preferred form of shackle illustrated in Figs. 4–8. The casing for each shackle comprises an upper U-shaped strip 105 which embraces the upper ends and opposite side edges of the upper shackle heads 88, thereby to completely house the upper ends of the laminated resilient strips 93. The opposite edges of this U-shaped strip 105 are welded to the corresponding shackle heads as indicated at 106 in Fig. 13. The casing for the lower part of the shackle comprises a similar U-shaped strip 107 which embraces and is welded to the lower shackle heads 91 as indicated at 108. The space between the upper and lower shackle heads 88 and 91 so encased is closed by a rubber boot 109 of any suitable form which thereby completely encases the resilient strips and wicking of the shackle. Lubricants can be applied to the wicking of the shackle by a valve fitting 110 in the upper U-shaped casing strip 105 and to which a pressure lubricant gun can be applied.

It is to be noted, in the form of spring suspension shown, that the starting and brake torque of the tandem axles is not transferred to the semi-elliptic springs 74 but is carried directly through the shackles 64, 64a and Y arms 62 to the frame. This permits the springs to carry the vertical loads only and do not have to be made heavy enough to carry momentary torque loads and hence do not have to be made so heavy as to interfere with their resilient characteristics in normal operation. It is also of great significance in the present invention that said semi-elliptic springs are not forced to carry any transverse loads which in actual practice are very heavy, and are imposed upon only those leaves of the ordinary, semi-elliptic spring suspension which are connected to the springs eyes 73. Also it is because of the fact that, in the present invention, the semi-elliptic springs 74 only carry the vertical loads, that their central bearings on the cross shaft 65 may be constructed very light and the cross shaft itself very light and the latter mounted in such rubber cushions as those shown in Fig. 3, as would absolutely be unfeasible in a spring which is forced to carry torque and/or transverse loads.

The pivots 61, 61a of the levers 62 incline to the horizontal, as previously described, to enable each wheel to move slightly rearwardly when it rises, and, conversely, to move slightly forwardly when it descends, so as to enable the horizontal component of the wheel axis movement to remain substantially constant, even though its peripheral speed is substantially constant but is travelling over a rough road.

In addition to this, the pivots 65 and 63 of the shackles 64, 64a are inclined with respect to a vertical plane positioned transversely of the vehicle. The reason for this angularity is as follows:

When the vehicle is travelling straight ahead, if the tandem axles 58, 60 are not parallel for any reason, they will automatically assume a parallel position because of the fact that any rear axle which is out of line will tend to follow a horizontal arc and this tendency, due to the lateral friction between the tires and the roadway, will cause a lateral movement of the axle relatively to the frame. Due to the fact that the shackles normally extend upwardly and inwardly, as shown in Fig. 3, and due to the further aforesaid angularity of the shackle pivots with respect to a vertical, transverse plane, this lateral movement is automatically caused to be translated into a slight turning movement of the whole axle, and this turning movement will continue until both of the rear axles are in line with each other. Such a movement, naturally, causes a change in the angularity of the shackles at the opposite ends of each axle and this change is resisted by gravity which, due to the obliquity of the shackles, is caused to act in a geometric manner. It is obvious that this self-steering movement should be as small as possible because of this gravitational resistance to lateral axle movement, and it is for this reason that the position of the rear axle in a horizontal plane is rendered adjustable by the adjusting screws 55, 55a and clamping bolts 57, 57a so as to reduce as much as possible the need for this self-steering. This adjustment permits the rear axle 60 to be properly aligned in the assembly room at the time of manufacture and also permits said axle to be brought back to alignment if frame distortion has occurred in use, as is very frequently the case.

The fact that the rear axles 58, 60 "trail" each other also occurs when the vehicle is making a turn on the road. In this case, just as when going straight ahead, the tires naturally tend to resist lateral scuffing and tend to push the axle laterally and, as a consequence, the whole axle moves obliquely to eliminate this scuffing. Thus when the vehicle is making a turn the two rear axles are caused to automatically move to such an oblique position, relatively to each other, as will cause their axes to intersect the axis of revolution of the two front wheels and will enable the vehicle to make the turn without tire scuffing. This action occurs when either the vehicle is steered around a long turn in the road or if it is steered sharply on a straight road, as, for instance, when overtaking a slow vehicle ahead, or otherwise avoiding some obstruction or other. It is to be understood that this action also takes place to some extent when a tendency to tire scuffing occurs because of one wheel or a pair of wheels at one end of an axle having a diameter different from the diameter of the wheel or pair of wheels at the other end of the same axle.

I claim as my invention:

1. In a vehicle spring suspension, between a frame and an axle having a wheel journaled thereon, two pairs of shackle heads, a plurality of flat resilient strips having their corresponding ends arranged between the corresponding pair of said shackle heads, means connecting each pair of said shackle heads with the corresponding ends of said strips, lubricant absorbent wicking arranged between said pairs of shackles heads and having a part arranged in contact with one edge of each of said strips, means connecting one of said pairs of shackle heads with said frame, and means connecting the other of said pairs of shackle heads with said axle.

2. In a vehicle spring suspension, between a frame and an axle having a wheel journaled thereon, two pairs of shackle heads, a plurality of flat resilient strips having their corresponding ends arranged between the corresponding pair of said shackle heads, means connecting each pair of said shackle heads with the corresponding ends of said strips, lubricant absorbent wicking arranged in contact with one edge of each of said strips and secured between and in contact with the internal faces of said pairs of shackle heads, means connecting one of said pairs of shackle heads with said frame, and means connecting the other of said pairs of shackle heads with said axle.

3. In a vehicle spring suspension, between a frame and an axle having a wheel journaled thereon, a pair of shackle heads, a pair of resilient strips connecting said shackle heads, lubricant absorbing wicking interposed between said shackle heads and arranged between said strips and in contact with the opposed surfaces of said shackle heads and strips, means connecting the one of said shackle heads with the frame, and means connecting the other of said shackle heads with the axle.

4. In a vehicle spring suspension, between a frame and an axle having a wheel journaled thereon, two pairs of shackle heads, a pair of resilient strips spaced in a direction transverse of their lines of flexure and each having one end arranged between one of said pairs of shackle heads and its other end arranged between the other of said pairs of shackle heads, means connecting each pair of said shackle heads with the corresponding ends of said strips, lubricant absorbent means arranged between said strips and between said shackle heads, means connecting one of said pairs of shackle heads with said frame, and means connecting the other of said pairs of shackle heads with said axle.

5. In a vehicle spring suspension, between a frame and an axle having a wheel journaled thereon, two pairs of shackle heads, a pair of resilient strips spaced in a direction transverse of their lines of flexure and each having one end arranged between one of said pairs of shackle heads and its other end arranged between the other of said pairs of shackle heads, means connecting each pair of said shackle heads with the corresponding ends of said strips, lubricant absorbent means arranged between said strips, means connecting one of said pairs of shackle heads with said frame comprising a pivot pin extending through said one pair of shackle heads and arranged between said pair of resilient strips and connected to said frame, and means connecting the other of said pairs of shackle heads with said axle.

6. In a vehicle spring suspension, between a frame and an axle having a wheel journaled thereon, two pairs of shackle heads, a pair of resilient strips spaced in a direction transverse of their lines of flexure and each having one end arranged between one of said pairs of shackle heads and its other end arranged between the other of said pairs of shackle heads, means connecting each pair of said shackle heads with the corresponding ends of said strips, lubricant absorbent means arranged between said strips, means connecting one of said pairs of shackle heads with said frame, and means connecting the other of said pairs of shackle heads with said axle comprising a pivot pin extending through said other pair of shackle heads and arranged between said pair of resilient strips and connected to said spindle.

7. In a vehicle spring suspension, between a frame and an axle having a wheel journaled thereon, two pairs of shackle heads, a pair of resilient strips spaced in a direction transverse of their lines of flexure, and each having one end arranged between one of said pairs of shackle heads and its other end arranged between the other of said pairs of shackle heads, each of said resilient strips being composed of a plurality of laminations, means connecting each pair of said shackle heads with the corresponding ends of said strips, lubricant absorbent means arranged between said strips and in contact with the edges of the laminations thereof and arranged between said shackle heads, means connecting one of said pairs of shackle heads with said frame, and means connecting the other of said pairs of shackle heads with said axle.

8. In a vehicle spring suspension, between a frame and an axle having a wheel journaled thereon, a pair of shackle heads having their opposing surfaces curved away from each other, a distancing member between said heads and engaging each of said heads to hold them in fixed spaced relation, a resilient strip disposed between said heads, means connecting said strip with said frame, and means connecting said heads with said axle.

9. In a vehicle spring suspension, between a frame and an axle having a wheel journaled thereon, a pair of shackle heads having their opposing surfaces curved away from each other, a pair of resilient strips spaced in a direction transverse of their lines of flexure and each having one end arranged between said pair of shackle heads, means connecting said one ends of said strips with said pair of shackle heads, a distancing member interposed between said curved surfaces of said heads and arranged between said strips, means connecting the other ends of said strips with said frame, and means connecting said heads with said axle.

10. In a vehicle spring suspension, between a frame and an axle having a wheel journaled thereon, a pair of shackle heads having their opposing surfaces curved away from each other, a pair of resilient strips spaced in a direction transverse of their lines of flexure and each having one end arranged between said pair of shackle heads, means connecting said one ends of said strips with said pair of shackle heads, a distancing member interposed between said curved surfaces of said heads and arranged between said strips, means connecting the other ends of said strips with said axle, and means connecting said heads with said frame.

11. In a vehicle spring suspension, between a frame and an axle having a wheel journaled thereon, two pairs of shackle heads having their opposing surfaces curved away from each other, a pair of resilient strips spaced in a direction transverse of their lines of flexure and each having one end arranged between one of said pairs of shackle heads and its other end between the other of said pairs of shackle heads, means connecting each pair of said shackle heads with the corresponding ends of said strips, a pair of distancing members each interposed between said curved surfaces of the corresponding pair of shackle heads and arranged between said pair of strips, means connecting one of said pairs of shackle heads with said frame comprising a pivot pin extending through said one pair of shackle heads and arranged between said pair of resilient strips and connected to said frame, and means connecting the other of said pairs of shackle heads with said axle comprising a pivot pin extending through said other pair of shackle heads and arranged between said pair of resilient strips.

12. In a vehicle spring suspension, between a frame and an axle having a wheel journaled thereon, two pairs of generally flat shackle heads, a resilient strip having each end arranged between the corresponding pair of said shackle heads, means connecting each pair of said shackle heads with the corresponding end of said strip, means connecting one of said pairs of shackle heads with said frame, means connecting the other of said pairs of shackle heads with said axle, and means encasing said shackle comprising a U-shaped strip embracing the edges of each pair of shackle heads and the corresponding edges of said resilient strip and a flexible boot embracing the opposing ends of said U-shaped strips and said pairs of said shackle heads.

13. In a vehicle spring suspension, between a frame and an axle having a wheel journaled thereon, two pairs of generally flat shackle heads, a resilient strip having each end arranged between the corresponding pair of said shackle heads, means connecting each pair of said shackle heads with the corresponding end of said strip, means connecting one of said pairs of shackle heads with said frame, means connecting the other of said pairs of shackle heads with said axle, and means encasing said shackle comprising a U-shaped strip embracing the edges of each pair of shackle heads and the corresponding edges of said resilient strip and welded thereto and a flexible boot embracing the opposing ends of said U-shaped strips and said pairs of said shackle heads.

14. In a vehicle spring suspension, between a frame and an axle having a wheel journaled thereon, two pairs of generally flat shackle heads, a resilient strip having each end arranged between the corresponding pair of said shackle heads, means connecting each pair of said shackle heads with the corresponding end of said strip, means connecting one of said pairs of shackle heads with said frame, means connecting the other of said pairs of shackle heads with said axle, and means encasing said shackle comprising casing strips secured to the opposite side edges of each pair of shackle heads and a flexible boot embracing the opposing ends of said casing strips and said pairs of said shackle heads.

15. In a vehicle spring suspension, between a frame and an axle having a wheel journaled thereon, a laminated shackle comprising a plurality of central, flat, resilient metal strips, two groups of flat resilient metal side strips arranged at each side and at opposite ends of said central strips, the opposing ends of said side strips of said two groups at the same side of said central strip being oppositely stepped to provide a substantially symmetrical laminated structure of metal strips of progressively increasing thickness progressing substantially from the center of said central strips toward the opposite ends of said structure and a pair of shackle heads embracing each end of said structure, means connecting one end of said shackle with said frame, and means connecting the other end of said shackle with said axle.

16. In a vehicle spring suspension, between a frame and an axle having a wheel journaled thereon, a shackle composed of a plurality of laminated resilient metal strips of substantially the same effective length, said strips being of progressively increasing thickness from the outside strip of said plurality of strips toward the center thereof and a pair of shackle heads embracing each end of said plurality of laminated strips, means connecting one pair of said shackle heads and the corresponding ends of said resilient strips with said frame, and means connecting the other pair of said shackle heads and the corresponding ends of said resilient strips with said axle.

17. In a vehicle spring suspension, between a frame and an axle having a wheel journaled thereon, a pair of shackle heads having their opposing surfaces curved away from each other, a distancing member interposed between said curved surfaces of said heads and engaging each of said heads to hold them in fixed spaced relation, a resilient strip interposed between said heads, means connecting said strip with said frame, and means connecting said heads with said axle.

ALBERT F. HICKMAN.